United States Patent [19]

Perry et al.

[11] 4,057,753

[45] Nov. 8, 1977

[54] TRAIN VEHICLE CONTROL APPARATUS

[75] Inventors: Robert H. Perry, Canonsburg; Howard N. Miller, McMurray, both of Pa.

[73] Assignee: Westinghouse Electric Corporation, Pittsburgh, Pa.

[21] Appl. No.: 621,974

[22] Filed: Oct. 14, 1975

[51] Int. Cl.² .......................... H02P 3/14; B60L 1/00
[52] U.S. Cl. ...................................... 318/376; 191/2; 191/4; 246/61
[58] Field of Search .......... 235/150.2, 150.23, 150.24, 235/150.53; 307/31, 32; 318/142, 144, 86, 87, 158, 392–394, 416, 370, 371, 375, 376, 378, 446, 454, 440; 246/182 A, 182 B, 41, 42, 61, 62, 72, 63 R, 63 A, 96–98, 177, 178; 104/148, 149; 191/2, 4

[56] References Cited

U.S. PATENT DOCUMENTS

| 1,245,222 | 11/1917 | Hall | 318/370 |
|---|---|---|---|
| 2,888,553 | 5/1959 | Freeman | 246/41 |
| 3,218,455 | 11/1965 | Hughson | 246/63 R |
| 3,604,905 | 9/1971 | Riondel | 235/150.53 |
| 3,657,625 | 4/1972 | Miller et al. | 318/370 |
| 3,661,093 | 5/1972 | Searle | 246/63 R |
| 3,846,687 | 11/1974 | Daniels et al. | 318/446 |
| 3,876,920 | 4/1975 | Meissen et al. | 318/370 |
| 3,893,695 | 7/1975 | Rickert | 235/150.2 |

Primary Examiner—Malcolm A. Morrison
Assistant Examiner—Errol A. Krass
Attorney, Agent, or Firm—R. G. Brodahl

[57] ABSTRACT

Control apparatus for determining the power regenerating operation of a train vehicle is disclosed in relation to the provision of a control signal in conjunction with the operation of the power supply rail of the train vehicle track, such that power regenerating operation of the train vehicle is prevented unless such operation is desired as indicated by the presence of that control signal.

5 Claims, 3 Drawing Figures

4,057,753

TRAIN VEHICLE CONTROL APPARATUS

BACKGROUND OF THE INVENTION

The field of the present invention relates to the protection of maintenance personnel and the like in relation to generated power provided by a train vehicle that is decelerating by regenerative braking and thereby supplying undesired power back to the power supply rail.

It is known in the prior art relating to train vehicle control apparatus to control the operation of one or more train vehicles moving along a track by using a control signal transmitted into the track and including modulated information, such as desired speed or the like, for controlling the operation of the train vehicle. A signal receiver carried by the train vehicle including a detector to remove the modulated information from the transmitted signal was operative to provide this modulated information for controlling the train vehicle as desired. An example of such a control system is shown by U.S. Pat. Nos. 3,532,877 and Re. 27,472 of G. M. Thorne-Booth and U.S. Pat. No. 3,551,889 of C. S. Miller.

It is also known in the prior art to control the propulsion motor current determining chopper operation for each car vehicle of a plural vehicle train by a provided control signal transmitted to each vehicle car of that train, as shown by U.S. Pat. No. 3,707,659 of H. C. Appelo. It is known to modulate the excitation voltage for the purpose of communicating with a train vehicle moving along a track as shown by U.S. Pat. No. 3,743,935 of G. L. Alt.

Prior art regenerative braking arrangements for a train vehicle using direct current choppers, where the power supply may be relatively non-receptive to receiving the regenerated power are shown by U.S. Pat. No. 3,657,625 of L. G. Miller et al. and U.S. Pat. No. 3,593,089 of H. C. Appelo, with the regenerative power generated being supplied to the power supply in relation to the power receptivity of the power supply.

It is known to control the dynamic braking effort provided by train vehicle motors in relation to an incoming control signal representing the motor current necessary to obtain the desired braking effort, as shown by U.S. Pat. No. 3,543,113 of L. G. Miller.

The propulsion control system takes power from the third rail and operates with the motor as a motor, whereas the regenerative braking control system operates with the motor as a generator to put electrical power back into the third rail. The associated switch gear operates with one of the propulsion control system or the regenerative brake control system to determine which way the involved electrical power will flow in relation to the third rail.

In the *Westinghouse Engineer* for September 1970 at pages 143 to 149, a published article entitled "Propulsion Control For Passenger Train Provides High Speed Service" describes motoring and dynamic braking operations of train vehicle motors. In the *Westinghouse Engineer* for March 1973 at pages 34 to 41, a published article entitled "Alternative Systems For Rapid Transit Propulsion And Electrical Braking" describes a thyristor system for controlling the motoring mode and the braking mode operations of train vehicle motors, including regenerative braking.

SUMMARY OF THE INVENTION

The present invention includes the provided insertion of a permissive control signal into the electrical propulsion power supplied by an external power supply to the train, when the train vehicle is controlled to decelerate by the operation of regenerative braking. This regenerative braking operation will occur only when the permissive signal is provided to indicate the power supply is operative with the train vehicle and it is desired for the external power supply to receive this regenerated power.

DESCRIPTION OF A PREFERRED EMBODIMENT

Figure 1:
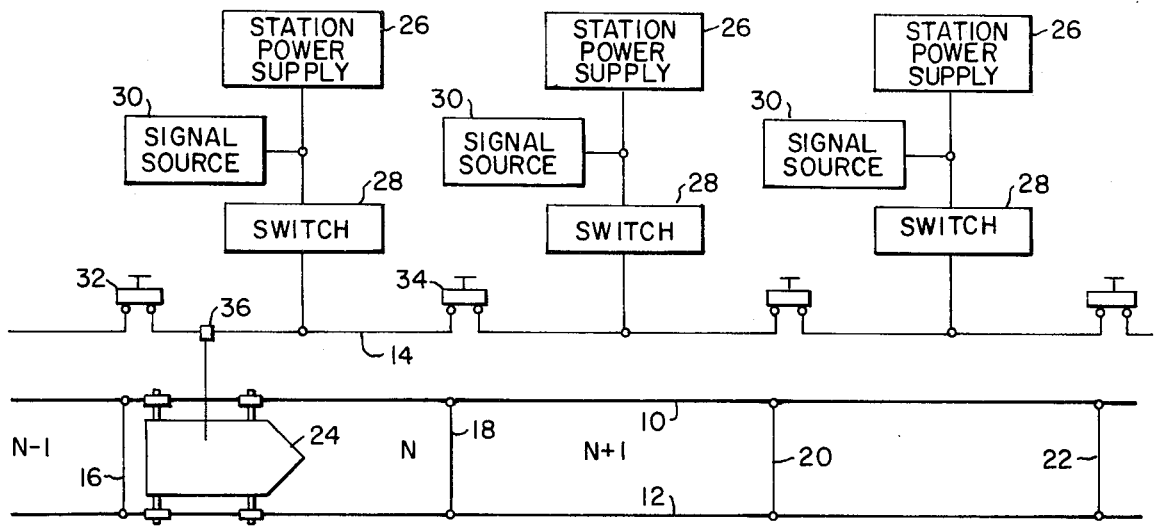
FIG. 1 is a diagrammatic showing of a train vehicle propulsion power supply arrangement in accordance with the present invention.

In FIG. 1 there is shown a train vehicle propulsion power supply arrangement including a pair of track rail members 10 and 12 and a third power supply rail 14. The track rail members 10 and 12 can be divided into well-known signal block stations by short-circuiting connection members 16, 18, 20 and 22 with an illustrative train vehicle 24 being positioned within the signal block station N defined by the members 16 and 18. A station power supply 26 is shown connected through a switch 28 to provide propulsion power to the third rail portion operative with station N. A signal source 30 also is connected through the switch 28 to energize the third rail portion operative with station N with a control signal having a predetermined frequency such as 10 KHz. A circuit breaker 32 is connected between the third rail portions operative respectively with station N and the station N−1 behind station N. A circuit breaker 34 is connected between the third rail portions operative respectively with station N and station N+1 ahead of station N. A power collector 36 connected to the train vehicle 24 is in electrical contact with the third rail portion operative with station N.

Figure 2:
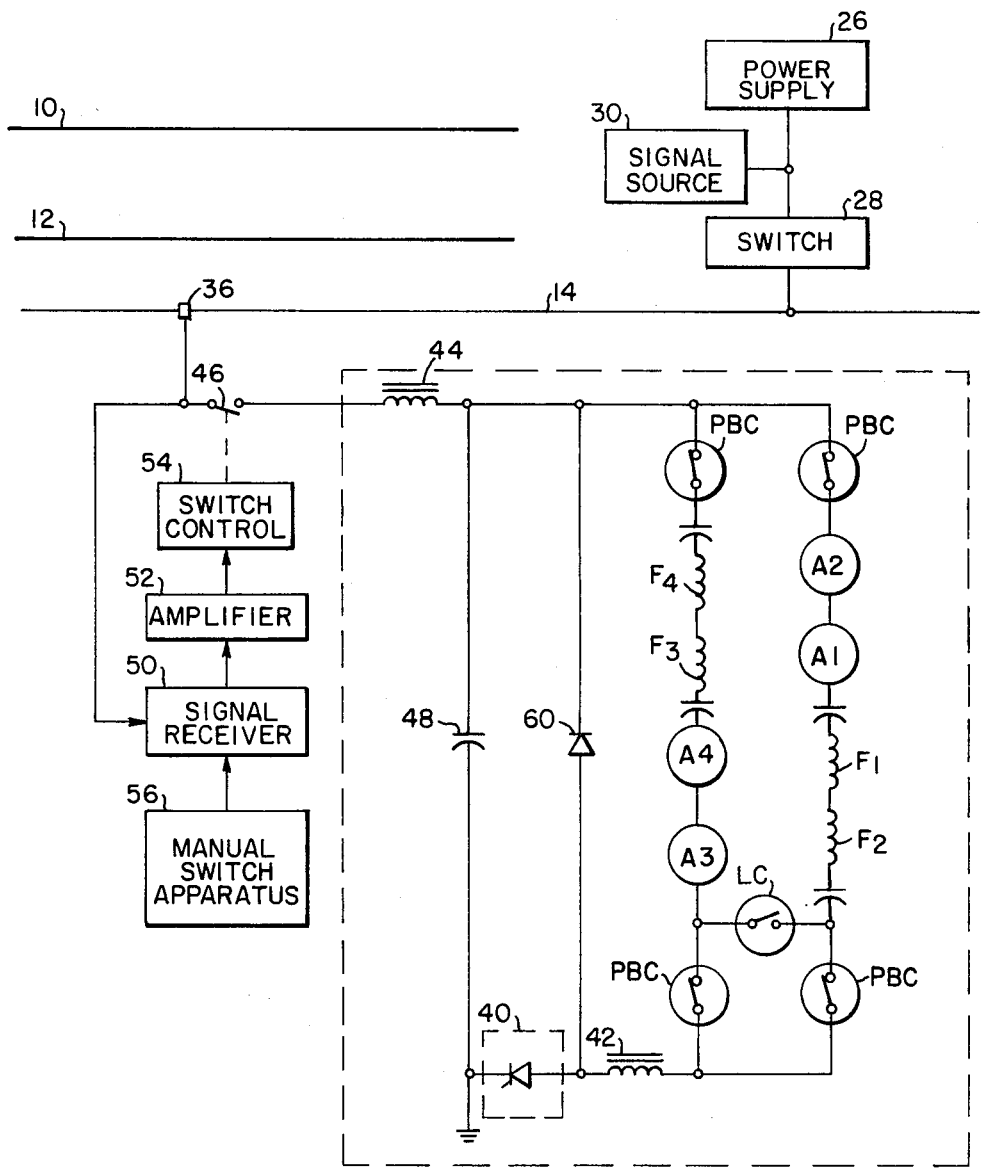
FIG. 2 is a diagrammatic showing of the present train vehicle motoring control apparatus.

In FIG. 2 there is shown the motoring control apparatus carried by the train vehicle, and operative with the power collector 36. In the motoring mode of operation the chopper 40 is used to regulate the armature current in the motor circuits. Turning the chopper 40 on builds up current in the motor armature by completing the circuit from the DC power supply 26 through the motors to ground. In FIG. 2 there are shown four motors connected with two in series and the two groups of two motors in parallel. The first motor armature A1 and the second motor armature A2 are shown connected in series with the field winding F1 of the first motor and the field winding F2 of the second motor. Similarly the third motor armature A3 and the fourth motor armature A4 are shown connected in series with the third motor field winding F3 and the fourth motor field winding F4. A motor reactor 42 is connected in series with the parallel combination of the propulsion motors. A line filter reactor 44 is connected in series with a line switch 46, with a line filter capacitor 48 connected between the line filter reactor 44 and ground. The modulated control signal from the signal source 30 passes through the switch 28 to the third rail 14 where the collector 36 senses the signal and supplies it to a signal receiver 50. When the signal receiver 50 senses the modulated control signal from the signal source 30 it provides an output signal through amplifier 52 to the switch control 54 for closing the line switch 46. If desired the train vehicle operator can manually close the line switch 46 through operation of the manual switch apparatus 56. In the motoring mode of operation as illustrated in FIG. 2 the chopper 40 is used to regulate the current in the motor circuits including the armatures and field windings as shown. Turning the chopper 40 on builds up current in the motors by completing the circuit from the DC power supply 26 through the motors to ground potential. When the chopper 40 is turned off the energy stored in the motor reactor 42 and the inductance of the motors maintains current flow in the motor circuit through the free wheeling diode 60. The operation of the chopper 40 is described in greater detail as set forth at page 38 of the above-referenced published article in the *Westinghouse Engineer* for March 1973.

The average voltage applied to the motors is controlled by adjusting the ratio of the chopper off time to the on time. This adjustment is made by a provided chopper control logic to maintain the desired average motor current and hence motor torque. The input to the control logic is from the train vehicle operator or the automatic train operation equipment as well known to persons skilled in this art. The motor circuit arrangement as shown in FIG. 2 operative with the chopper 40 is presently well known to persons skilled in this art and is operative with the Bay Area Rapid Transit Control System in San Francisco.

Figure 3:
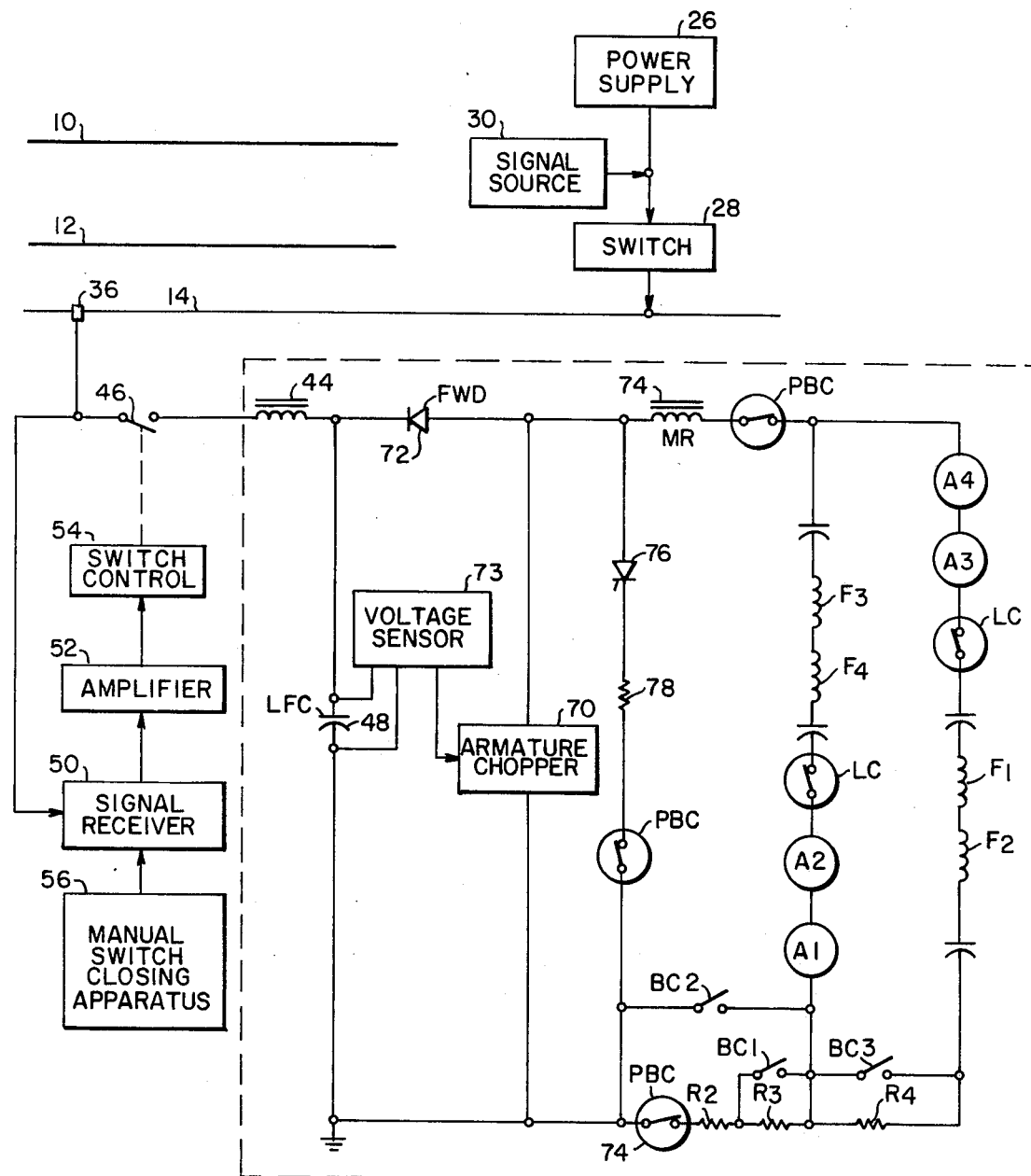
FIG. 3 is a diagrammatic showing of the present train vehicle regenerative braking control apparatus.

In FIG. 3 there is shown the regenerative braking control apparatus carried by the train vehicle and operative with the power collector 36. For the braking mode of operation the motors are reconnected by means of the power brake changeover devices PBC as well known to persons skilled in this art, with the circuit now being arranged for regenerative or dynamic braking with the motors operative as self-excited generators. The fields are cross-connected to force load division between the paralleled generators.

In the regenerative braking operation the function of the chopper 70 is the same as the chopper function in relation to the motoring operation shown in FIG. 2, such that the on-off ratio is regulated to maintain the desired current, with the more current the more braking that is provided. When the chopper is turned on the current in the motors increases and when the chopper is turned off the current flowing in the chopper is forced into the third rail 14 through the closed line switch 46 through the free wheeling diode 72 by the motor reactor 74. The chopper control including the voltage sensor 73 during the regenerative braking operation monitors the voltage across the line filter capacitor 48 and controls the chopper on-off ratio in such a manner as to prevent the capacitor voltage from exceeding the line voltage on the third rail 14, a condition that could result in increasing current during the chopper off time and loss of braking control. If the capacitor voltage during regeneration reaches a preset limit the chopper 70 is controlled to remove regenerative braking by turning the chopper off and keeping it off, with the remainder of the braking effort then being achieved by dynamic braking or by conventional friction brakes.

The DC series motor acting as a series generator inherently has a maximum generated voltage approximately twice line voltage. To provide for the maximum energy regeneration, the resistors R2, R3 and R4 are connected in series with the motors and the line by the power brake changeover 74. The IR drop across the resistors opposes the generated voltage such that the voltage across the capacitor does not exceed line voltage. As the train vehicle speed is reduced during regenerative braking the voltage of the series generators drops. When the on-off ratio of the chopper reaches the point where the off time is a minimum in order to maintain the motor current at the desired average value, the respective contactors BC1, BC2 and BC3 are closed. To reduce the IR drop in series with the generators in order that the chopper 70 can continue to maintain the same average braking current the chopper shifts from a minimum off condition to a minimum on condition whenever a shorting contactor is picked up in this manner. When the regeneration of power through the third rail 14 to the power supply 26 is not desired because of a dead third rail, loss of third rail power in the car or absence of load being taken from the third rail, or when the switch 28 is opened due to maintenance on the station section of the vehicle track, the circuit including thyristor 76 and the resistor 78 becomes operative to provide an almost instantaneous shift from regenerative braking to dynamic braking with the power being consumed in the resistor 78. The logic controlling the braking current makes a decision at the time of each on pulse as to whether the thyristor 76 only will be turned on or the chopper 70 will also be fired. If the logic determines that the power supply is not receptive to the regenerated energy the chopper 70 is not turned on and only the thyristor 76 is gated to divert the motor current through the resistor 78. At the time of the next on pulse the logic again determines the need to fire the chopper 70 on the basis of the power supply receptivity. Only when the third rail 14 becomes receptive to regenerative power will the chopper 70 be gated and permit voltage generated to rise to the point where the motor current again flows into the third rail 14 through the switch 28 to the power supply 26.

When maintenance is required on a section of vehicle track or if any personnel are in hazard on a train vehicle right-of-way it is standard practice to de-energize and lock out the third rail sections involved. In relation to FIG. 1 and station N this can be done by opening the switch 28 and opening the circuit breakers 32 and 34 such that the portion of the third rail 14 operative with the station N becomes de-energized. A problem exists however if a train vehicle enters from an adjacent station such as station N−1. Since it is not desired that the train vehicle be energized in station N it is desired to stop the movement of the train vehicle and this can be done by regeneration of power from the train vehicle back to the station power supply 26. However, it may not be desired at this time that regeneration by the train vehicle 24 take place. On some train control systems it is a practice to ground the de-energized third rail portion and this signals the train vehicle 24 to cease regeneration. However, on older systems the third rail section is merely isolated and the addition of the grounding breaker can be rather expensive. Since the regenerating power supplied by a moving train vehicle in de-energized station N is in effect an additional power supply, the injected control signal from the signal source 30 operates as a permissive signal supplied to the portion of the third rail operative with the station N and is sensed by the train vehicle 24 to indicate that power regeneration is permitted only when the control signal from the signal source 30 is present. The control signal frequency which can be modulated for fail-safe design is injected through the switch 28 into the third rail portion operative with the station N. The signal receiver on board the train vehicle 24 senses the control signal when the train vehicle enters the station N and detects the modulated control signal which is now used to permit power regeneration. When the switch 28 is opened to remove power from the station power supply in relation to the third rail 14 operative with the station N the control signal from the signal source 30 is also removed from the third rail portion operative with the station N and the train vehicle 24 does not sense this signal and is not permitted to regenerate power into the third rail portion operative with the station N.

In accordance with the present invention, the line switch 46 is opened when the power supply 26 is disconnected from the third rail 14 by the opening of the switch 28 in relation to the operation of the motoring control apparatus shown in FIG. 2 and the braking control apparatus shown in FIG. 3. When power regeneration is not desired because the power supply 26 has been disconnected from the third rail 14 through the opening of the switch 28, the regenerative braking control apparatus as shown in FIG. 3 will become operative with the dynamic braking resistor 78.

Loss of the control signal from the signal source 30 is fail-safe in operation since the regenerated power is disconnected from the third rail 14 through the open line switch 46 and cannot be supplied to the third rail 14. The signal receiver 50 can include a suitable bandpass filter operative with the frequency of the control signal from the signal source 30.

It should be understood that the line filter capacitor 48 becomes charged by the voltage from the main power supply 26 and it is necessary to disconnect the line filter capacitor 48 from the third rail 14 to prevent the filter capacitor from energizing the third rail, and this is done by opening the line switch 46 connecting the input filter 44 through the collector 36 to the third rail 14. Both the regenerated power from the generating motors of the train vehicle as well as the voltage charge across the line filter capacitor 48 are prevented from energizing the third rail 14, when the line switch 46 is open.

We claim:

1. In apparatus operative with a power supply for controlling the power regeneration operation of a train vehicle moving along a track, said apparatus comprising
    means connected to said power supply and providing a predetermined control signal,
    switch means connected between said signal providing means and said track for energizing said track with said control signal,
    means for sensing the provision of said control signal in said track and
    means connected to said sensing means for controlling the power regeneration operation of said train vehicle moving along said track, with said controlling means connecting said train vehicle to said power supply when said control signal is provided and disconnecting said train vehicle from said power supply when said control signal is not provided.

2. The apparatus of claim 1, wherein said controlling means includes at least one motor having a motoring mode of operation during which the train vehicle is accelerated along said track and having a regenerative braking mode of operation during which said train vehicle is decelerated along said track.

3. The apparatus of claim 1, wherein said sensing means responds to a predetermined frequency of said control signal.

4. The apparatus of claim 1, wherein said sensing means includes a detector operative to sense the provision of said predetermined control signal, and with said controlling means being operatively connected to said detector to disconnect said power supply when said control signal is not provided.

5. The apparatus of claim 1, wherein said controlling means includes a switch connected to said sensing means and which switch is closed when said control signal is provided and is open when said control signal is not provided.

* * * * *